US010566774B1

(12) United States Patent
Krietzman

(10) Patent No.: US 10,566,774 B1
(45) Date of Patent: Feb. 18, 2020

(54) CABLE PATHWAY DIVIDER AND METHOD FOR INSTALLING SAME

(71) Applicant: CHATSWORTH PRODUCTS, INC., Agoura Hills, CA (US)

(72) Inventor: William Drew Krietzman, Castle Rock, CO (US)

(73) Assignee: Chatsworth Products, Inc., Agoura Hills, CA (US)

(*) Notice: Subject to any disclaimer, the term of this patent is extended or adjusted under 35 U.S.C. 154(b) by 0 days.

(21) Appl. No.: 16/362,909

(22) Filed: Mar. 25, 2019

Related U.S. Application Data

(63) Continuation of application No. 15/994,380, filed on May 31, 2018, now Pat. No. 10,243,334, which is a continuation of application No. 15/352,538, filed on Nov. 15, 2016, now Pat. No. 10,003,180.

(60) Provisional application No. 62/260,936, filed on Nov. 30, 2015, provisional application No. 62/260,888, filed on Nov. 30, 2015, provisional application No. 62/260,895, filed on Nov. 30, 2015.

(51) Int. Cl.
*F16L 3/22* (2006.01)
*H02G 3/04* (2006.01)
*F16L 3/26* (2006.01)

(52) U.S. Cl.
CPC .......... *H02G 3/04* (2013.01); *F16L 3/22* (2013.01); *H02G 3/0456* (2013.01); *F16L 3/26* (2013.01)

(58) Field of Classification Search
None
See application file for complete search history.

(56) References Cited

U.S. PATENT DOCUMENTS

| 824,544 | A | * | 6/1906 | Hossege | F16L 3/1025 174/146 |
|---|---|---|---|---|---|
| D171,224 | S |  | 12/1953 | Pfaff, Jr. |  |
| 3,042,351 | A |  | 7/1962 | DuBois |  |
| 3,485,937 | A |  | 12/1969 | Caveney |  |
| 3,705,949 | A |  | 12/1972 | Weiss |  |
| 3,761,603 | A |  | 9/1973 | Hays et al. |  |
| 3,890,459 | A |  | 6/1975 | Caveney |  |
| 3,968,322 | A |  | 7/1976 | Taylor |  |

(Continued)

FOREIGN PATENT DOCUMENTS

| CA | 1337647 C | 11/1995 |
|---|---|---|
| CA | 2137879 | 3/1999 |

(Continued)

OTHER PUBLICATIONS

Information Disclosure Statement (IDS) Letter Regarding Common Patent Application(s), dated May 7, 2019.

*Primary Examiner* — Monica E Millner
(74) *Attorney, Agent, or Firm* — Tillman Wright, PLLC; James D. Wright; David R. Higgins

(57) ABSTRACT

A cable pathway divider, for installation on a cable runway, includes a pair of post halves and a ring-shaped locking member. Each post half includes a base portion and an extension portion, and the base portions of the post halves are arrangeable at opposite sides of a cross member of a cable runway. The post halves are securable to one another from opposite sides of the cross member, via clamping arrangement of the ring-shaped locking member relative to the post halves, such that the extension portions extend into a space above the cable runway to divide the cable runway into at least two cable paths.

10 Claims, 11 Drawing Sheets

(56) References Cited

U.S. PATENT DOCUMENTS

| | | | |
|---|---|---|---|
| 4,046,957 A | 9/1977 | Taylor et al. | |
| 4,136,257 A | 1/1979 | Taylor | |
| 4,398,564 A | 8/1983 | Young et al. | |
| 4,470,622 A * | 9/1984 | Pate | F16L 3/1236 285/419 |
| 5,009,383 A | 4/1991 | Chapman | |
| 5,023,404 A | 6/1991 | Hudson et al. | |
| 5,235,136 A | 8/1993 | Santucci et al. | |
| 5,384,937 A | 1/1995 | Simon | |
| 5,531,410 A | 7/1996 | Simon | |
| 5,580,014 A | 12/1996 | Rinderer | |
| 5,586,012 A | 12/1996 | Lerman | |
| 5,602,364 A | 2/1997 | Ustin | |
| 5,640,482 A | 6/1997 | Barry et al. | |
| 5,758,002 A | 5/1998 | Walters | |
| 5,806,811 A | 9/1998 | Viklund et al. | |
| 5,902,961 A | 5/1999 | Viklund et al. | |
| 5,921,402 A | 7/1999 | Magenheimer | |
| 5,927,658 A | 7/1999 | Gerster | |
| 5,953,870 A | 9/1999 | Jette | |
| 6,023,024 A * | 2/2000 | Stjerneby | H02G 3/0443 174/95 |
| 6,044,194 A | 3/2000 | Meyerhoefer | |
| 6,061,884 A | 5/2000 | Ohms et al. | |
| 6,105,218 A | 8/2000 | Reekie | |
| 6,129,316 A | 10/2000 | Bauer | |
| 6,138,961 A | 10/2000 | Zweig | |
| 6,181,862 B1 | 1/2001 | Noble et al. | |
| 6,193,434 B1 | 2/2001 | Durin et al. | |
| 6,215,069 B1 | 4/2001 | Martin et al. | |
| 6,220,554 B1 | 4/2001 | Daoud | |
| 6,227,502 B1 | 5/2001 | Derman | |
| 6,239,364 B1 | 5/2001 | Nickel | |
| 6,245,998 B1 | 6/2001 | Curry et al. | |
| 6,247,871 B1 | 6/2001 | Nickel et al. | |
| 6,311,732 B1 | 11/2001 | Nickel | |
| 6,340,141 B1 | 1/2002 | Rinderer | |
| 6,347,493 B1 | 2/2002 | Jette | |
| 6,398,149 B1 | 6/2002 | Hines et al. | |
| 6,402,418 B1 | 6/2002 | Durin et al. | |
| 6,427,400 B1 | 8/2002 | Greenblatt | |
| 6,437,243 B1 | 8/2002 | VanderVelde et al. | |
| 6,437,244 B1 | 8/2002 | VanderVelde | |
| 6,449,912 B2 | 9/2002 | Jette | |
| 6,463,704 B1 | 10/2002 | Jette | |
| 6,467,633 B1 | 10/2002 | Mendoza | |
| 6,468,112 B1 | 10/2002 | Follingstad et al. | |
| 6,489,565 B1 | 12/2002 | Krietzman et al. | |
| 6,489,566 B1 | 12/2002 | Durin | |
| 6,584,267 B1 | 6/2003 | Caveney et al. | |
| 6,590,154 B1 | 7/2003 | Badey et al. | |
| 6,600,107 B1 | 7/2003 | Wright et al. | |
| 6,605,782 B1 | 8/2003 | Krietzman et al. | |
| 6,614,978 B1 | 9/2003 | Caveney et al. | |
| 6,637,165 B1 | 10/2003 | Jette | |
| 6,637,704 B2 | 10/2003 | Jette | |
| 6,672,022 B2 | 1/2004 | Simmons | |
| 6,677,530 B2 * | 1/2004 | Blaha | H01R 4/22 174/84 R |
| 6,729,606 B1 | 5/2004 | Durin | |
| 6,760,531 B1 | 7/2004 | Solheid et al. | |
| 6,766,093 B2 | 7/2004 | McGrath et al. | |
| 6,796,437 B2 | 9/2004 | Krampotich et al. | |
| 6,855,884 B2 | 2/2005 | Spagnoli et al. | |
| 6,884,942 B2 | 4/2005 | McGrath et al. | |
| 6,918,796 B2 | 7/2005 | Elliot et al. | |
| 6,964,588 B2 | 11/2005 | Follingstad et al. | |
| 6,981,893 B2 | 1/2006 | Barker et al. | |
| 7,083,051 B2 | 8/2006 | Smith et al. | |
| 7,130,521 B2 * | 10/2006 | McCrary | G02B 6/4459 385/136 |
| 7,168,212 B2 | 1/2007 | Jette | |
| 7,220,150 B2 | 5/2007 | Follingstad et al. | |
| 7,285,027 B2 | 10/2007 | McGrath et al. | |
| 7,362,941 B2 | 4/2008 | Rinderer et al. | |
| 7,373,759 B1 | 5/2008 | Simmons | |
| 7,381,100 B2 | 6/2008 | Follingstad et al. | |
| 7,425,678 B2 | 9/2008 | Adducci et al. | |
| 7,427,713 B2 | 9/2008 | Adducci et al. | |
| 7,437,048 B2 | 10/2008 | Farrell et al. | |
| 7,458,859 B2 | 12/2008 | McGrath et al. | |
| 7,476,801 B1 | 1/2009 | Davis et al. | |
| 7,476,804 B2 | 1/2009 | Adducci et al. | |
| 7,485,803 B2 | 2/2009 | Adducci et al. | |
| 7,495,169 B2 | 2/2009 | Adducci et al. | |
| 7,498,512 B2 | 3/2009 | Adducci et al. | |
| 7,504,581 B2 | 3/2009 | Adducci et al. | |
| 7,527,226 B2 | 5/2009 | Kusuda et al. | |
| 7,546,987 B2 | 6/2009 | Sinkoff | |
| 7,592,541 B2 | 9/2009 | Adducci et al. | |
| 7,608,779 B2 | 10/2009 | Adducci et al. | |
| 7,637,771 B2 | 12/2009 | Laursen | |
| 7,667,135 B2 | 2/2010 | Adducci et al. | |
| 7,718,891 B2 | 5/2010 | Adducci et al. | |
| 7,762,405 B2 | 7/2010 | Vogel et al. | |
| 7,772,489 B2 | 8/2010 | Adducci et al. | |
| 7,778,513 B2 | 8/2010 | Rinderer et al. | |
| 7,781,675 B2 | 8/2010 | Adducci et al. | |
| 7,795,532 B2 | 9/2010 | Walker | |
| 7,893,356 B2 | 2/2011 | Garza et al. | |
| 7,938,371 B2 * | 5/2011 | Oga | F16L 3/1025 248/55 |
| 7,939,763 B2 | 5/2011 | Jones et al. | |
| 7,952,027 B2 * | 5/2011 | Grelck | H02G 3/32 138/111 |
| 7,952,057 B2 | 5/2011 | Grelck | |
| 7,954,776 B2 | 6/2011 | Davis et al. | |
| 7,973,242 B2 * | 7/2011 | Jones | H04Q 1/06 174/100 |
| 7,974,105 B2 | 7/2011 | Dean, Jr. et al. | |
| 7,999,183 B2 | 8/2011 | Garza et al. | |
| 8,003,890 B2 | 8/2011 | Donowho et al. | |
| 8,014,171 B2 * | 9/2011 | Kelly | H04Q 1/064 361/810 |
| 8,035,965 B2 | 10/2011 | Adducci et al. | |
| 8,056,868 B2 | 11/2011 | Vander Griend | |
| 8,097,808 B2 | 1/2012 | Quertelet et al. | |
| 8,138,419 B2 | 3/2012 | Garza et al. | |
| 8,237,052 B2 | 8/2012 | Adducci et al. | |
| 8,263,867 B2 | 9/2012 | Garza et al. | |
| 8,273,989 B2 | 9/2012 | Garza et al. | |
| 8,330,043 B2 | 12/2012 | Alaniz et al. | |
| 8,395,046 B2 | 3/2013 | Nicewicz et al. | |
| 8,411,465 B2 | 4/2013 | Dean, Jr. et al. | |
| 8,437,147 B2 | 5/2013 | Dean, Jr. et al. | |
| 8,558,113 B2 | 10/2013 | Krietzman et al. | |
| 8,879,881 B2 * | 11/2014 | Cote | G02B 6/4471 174/50 |
| 9,112,341 B2 * | 8/2015 | Eshima | H02G 3/32 |
| 9,350,146 B2 | 5/2016 | Krietzman et al. | |
| 9,363,922 B2 * | 6/2016 | Larsen | H05K 7/18 |
| 9,402,329 B1 | 7/2016 | Chen et al. | |
| 9,548,597 B2 * | 1/2017 | Vacca | H04Q 1/06 |
| 9,556,976 B1 * | 1/2017 | Thompson | H02G 1/08 |
| 10,003,180 B1 * | 6/2018 | Krietzman | H02G 3/04 |
| 10,243,334 B1 | 3/2019 | Krietzman | |
| 10,271,452 B2 | 4/2019 | Hennrich et al. | |
| 2001/0022231 A1 | 9/2001 | Dyer | |
| 2002/0074149 A1 * | 6/2002 | Lawrence | H02B 1/202 174/72 A |
| 2002/0184843 A1 | 12/2002 | Jette | |
| 2004/0055232 A1 | 3/2004 | Jette | |
| 2004/0056157 A1 | 3/2004 | Dufourg | |
| 2004/0094491 A1 | 5/2004 | Smith et al. | |
| 2005/0247650 A1 | 11/2005 | Vogel et al. | |
| 2006/0038091 A1 | 2/2006 | Winn et al. | |
| 2006/0162948 A1 | 7/2006 | Rinderer et al. | |
| 2006/0171651 A1 | 8/2006 | Laursen | |
| 2007/0210679 A1 | 9/2007 | Adducci et al. | |
| 2007/0210680 A1 | 9/2007 | Appino et al. | |
| 2007/0210681 A1 | 9/2007 | Adducci et al. | |
| 2007/0210683 A1 | 9/2007 | Adducci et al. | |
| 2007/0210686 A1 | 9/2007 | Adducci et al. | |
| 2007/0221393 A1 | 9/2007 | Adducci et al. | |

(56) References Cited

U.S. PATENT DOCUMENTS

| | | |
|---|---|---|
| 2007/0249237 A1 | 10/2007 | Follingstad et al. |
| 2007/0293138 A1 | 12/2007 | Adducci et al. |
| 2008/0067904 A1 | 3/2008 | Adducci et al. |
| 2008/0074849 A1 | 3/2008 | Adducci et al. |
| 2008/0174217 A1 | 7/2008 | Walker |
| 2008/0271918 A1 | 11/2008 | Caveney et al. |
| 2009/0224110 A1 | 9/2009 | Donowho et al. |
| 2009/0236117 A1 | 9/2009 | Garza et al. |
| 2009/0273915 A1 | 11/2009 | Dean, Jr. et al. |
| 2010/0101820 A1 | 4/2010 | Alaniz et al. |
| 2010/0122830 A1 | 5/2010 | Garza et al. |
| 2010/0126750 A1 | 5/2010 | Garza et al. |
| 2010/0126751 A1 | 5/2010 | Garza et al. |
| 2010/0171004 A1 | 7/2010 | Young |
| 2010/0193754 A1 | 8/2010 | Garza et al. |
| 2010/0200707 A1 | 8/2010 | Garza et al. |
| 2011/0011612 A1 | 1/2011 | Sayres |
| 2011/0056895 A1 | 3/2011 | Tichy |
| 2011/0211328 A1 | 9/2011 | Dean, Jr. et al. |
| 2011/0211329 A1 | 9/2011 | Dean, Jr. et al. |
| 2012/0062091 A1 | 3/2012 | Donowho et al. |
| 2012/0181906 A1 | 7/2012 | Caveney |
| 2012/0267991 A1 | 10/2012 | Adducci et al. |
| 2018/0110153 A1 | 4/2018 | Ennrich et al. |
| 2019/0098791 A1 | 3/2019 | Hennrich et al. |
| 2019/0098792 A1 | 3/2019 | Hennrich et al. |

FOREIGN PATENT DOCUMENTS

| | | |
|---|---|---|
| EP | 0298825 A1 | 4/1992 |
| ES | 2007578 T3 | 1/1992 |
| FR | 2617341 A1 | 12/1988 |
| GB | 2285343 A | 7/1995 |
| PT | 87843 B | 5/1989 |
| WO | 9715774 A1 | 5/1997 |
| WO | 2009089307 A2 | 7/2009 |
| WO | 2009089307 A3 | 12/2009 |
| WO | 2018022721 A1 | 2/2018 |

\* cited by examiner

CABLE PATHWAY DIVIDER AND METHOD FOR INSTALLING SAME

CROSS-REFERENCE TO RELATED APPLICATIONS

The present application is a U.S. continuation patent application of, and claims priority under 35 U.S.C. § 120 to, U.S. nonprovisional patent application Ser. No. 15/994,380, filed May 31, 2018, which '380 application issued as U.S. Pat. No. 10,243,334 on Mar. 26, 2019, which '380 application and the patent issuing therefrom are each incorporated by reference herein in their entirety, and which '380 application is a U.S. continuation patent application of, and claims priority under 35 U.S.C. § 120 to, U.S. nonprovisional patent application Ser. No. 15/352,538, filed Nov. 15, 2016, which '538 application issued as U.S. Pat. No. 10,003, 180 on Jun. 19, 2018, which '538 application and the patent issuing therefrom are each incorporated by reference herein in their entirety, and which '538 application is a U.S. nonprovisional patent application of, and claims priority under 35 U.S.C. § 119(e) to each of:

(a) U.S. provisional patent application Ser. No. 62/260, 888, filed Nov. 30, 2015 and entitled, "CABLE PATHWAY DIVIDER," which '888 application is incorporated by reference herein in its entirety;

(b) U.S. provisional patent application Ser. No. 62/260, 895, filed Nov. 30, 2015 and entitled, "INSIDE CABLE DROP FOR CABLE RUNWAY," which '895 application is incorporated by reference herein in its entirety, and a copy of which '895 application is appended hereto as Appendix A, which appendix is likewise incorporated by reference herein in its entirety; and (c) U.S. provisional patent application Ser. No. 62/260, 936, filed Nov. 30, 2015 and entitled, "OUTSIDE CABLE DROP FOR CABLE RUNWAY," which '936 application is incorporated by reference herein in its entirety, and a copy of which '936 application is appended hereto as Appendix B, which appendix is likewise incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to dividers for cable pathways, and, in particular, to cable pathway dividers that can be installed or removed without the aid of tools.

Background

Cable runways are commonly used in data centers or equipment rooms to define a path for routing cables. Each cable runway generally includes a pair of spaced-apart parallel rails and a plurality of transverse cross members interconnecting the rails at various intervals, thereby having the general appearance of a ladder. Many cable runways are modular in nature, and a plurality of cable runways may be installed in conjunction with one another to produce a cable runway system. Once the cable runway system is installed, individual cables and cable bundles are supported along the cable runways by the transverse cross members.

Due to the wide variety of cabling requirements that exist within a data center, there is often a need to define more than one different cable path along a single cable runway. As a result, cable pathway dividers can be used to establish separate paths so that cables can be routed more easily to a particular destination within the data center. A typical cable pathway divider employs metal mounting clips, which are attached to transverse cross members of the cable runway using a machine screw and wing nut or other fastener. Each mounting clip includes a spool—often made from a plastic material—that extends upwardly into the space for supporting cables on the cable runway. The spools effectively divide the runway into separate paths, with cables that need to be kept separate from one another being routed at either side of a row of such spools.

Routing cables along cable runways generally requires the installation of many of these dividers and, in many cases, entails several adjustments to their location. Fastening the mounting clips to the transverse cross members involves securing the fastener by hand or with the aid of a separate tool (e.g., a wrench). When large quantities of mounting clips are required, the installation process can become quite cumbersome and time-consuming, as each mounting clip fastener must be secured separately. The process can become even more tedious when minor adjustments in the location of mounting clips are required to meet a specific need.

Accordingly, in order to reduce assembly time and reduce associated costs, a need exists for a cable pathway divider that can be installed in an efficient manner without the aid of tools.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes a cable pathway divider for installation on a cross member of a cable runway. The cable pathway divider includes a pair of post halves, each having a base portion and an extension portion, and a locking member. The post halves are adapted to be clamped at opposite sides of a cross member of a cable runway via the locking member such that the extension portions extend into a space above the cable runway to divide the cable runway into at least two cable paths.

In features of this aspect, the post halves may be interlocking post halves; the post halves may be identical to one another; and/or each post half may include one or more alignment tabs to facilitate alignment during installation.

In another feature of this aspect, each post half may include a prong and a socket disposed at opposite sides of a center line. In another feature of this aspect, when the post halves are mated together during installation, the prong of each post half may be received within the socket of the other post half.

In another feature of this aspect, the base portion of each post half may include a channel. In another feature of this aspect, when the post halves are mated together during installation, the channels of the base portions may cooperate to receive the cross member of the cable runway.

In another feature of this aspect, each post half may include a slot at a distal end of the extension portion and a hinge member having a tab, each of the slot and the hinge member being disposed at opposite sides of a center line. In another feature of this aspect, when the post halves are coupled during installation, the tab of each post half may be received within the slot of the other post half, thereby defining a hinge mechanism.

In another feature of this aspect, the locking member may be a locking ring that surrounds the pair of post halves when mated together so as to clamp the post halves onto the cross member.

In another feature of this aspect, the locking ring may include a grip to facilitate installation on the post halves.

In another feature of this aspect, at least one post half may include a retaining boss to retain the locking member in a locked state. In another feature of this aspect, the locking member may include at least one recess to accommodate the at least one retaining boss.

In another feature of this aspect, the post halves and locking member may be made from a plastic material.

In another feature of this aspect, the cross member may be a UL crossbar. In another feature of this aspect, the cross member may be a universal crossbar. In another feature of this aspect, the cross member may be an extruded aluminum crossbar.

Broadly defined, the present invention according to another aspect includes a cable runway. The cable runway includes a pair of parallel rails, at least one cross member interconnected between the rails, and at least one cable pathway divider installed on the at least one cross member. The at least one cable pathway divider includes a pair of post halves and a locking member. The locking member clamps the post halves at opposite sides of the cross member such that the post halves extend into a space above the cable runway to divide the cable runway into at least two cable paths.

In features of this aspect, the post halves may be interlocking post halves; and/or the post halves may be identical to one another.

In another feature of this aspect, the cross member may be a UL crossbar. In another feature of this aspect, the cross member may be a universal crossbar. In another feature of this aspect, the cross member may be an extruded aluminum crossbar.

In another feature of this aspect, the locking member may be a locking ring that surrounds the pair of post halves when mated together so as to clamp the post halves onto the cross member.

Broadly defined, the present invention according to another aspect includes a method of installing a cable pathway divider on a cross member of a cable runway. The method includes: positioning a pair of post halves of a cable pathway divider at opposite sides of a cross member of a cable runway; and clamping the pair of post halves to the cross member via a locking member such that the post halves extend into a space above the cable runway to divide the cable runway into at least two cable paths.

In features of this aspect, the post halves may be interlocking post halves; and/or the post halves may be identical to one another.

In other features of this aspect, the method may further include aligning the pair of post halves with one another via alignment tabs disposed on each post half; the method may further include inserting a prong of each post half into a socket of the other post half, wherein, for each post half, the prong and the socket are disposed at opposite sides of a center line; the method may further include engaging a hinge member of each post half into a slot at a distal end of the other post half, thereby forming a hinge mechanism, wherein, for each post half, the hinge member and the slot are disposed at opposite sides of a center line; and/or the method may further include engaging a retaining boss of at least one of the pair of post halves with at least one recess of the locking member.

In another feature of this aspect, the cross member may be a UL crossbar. In another feature of this aspect, the cross member may be a universal crossbar. In another feature of this aspect, the cross member may be an extruded aluminum crossbar.

In another feature of this aspect, the locking member may be a locking ring, and clamping the pair of post halves to the cross member may include lowering the locking ring downward around the pair of post halves such that it surrounds the pair of post halves to clamp the post halves onto the cross member.

Broadly defined, the present invention according to another aspect includes a cable pathway divider, for installation on a cross member of a cable runway, substantially as shown and described.

Broadly defined, the present invention according to another aspect includes a cable pathway divider substantially as shown and described.

Broadly defined, the present invention according to another aspect includes a cable runway, including a cable pathway divider, substantially as shown and described.

Broadly defined, the present invention according to another aspect includes a method of installing a cable pathway divider on a cross member of a cable runway substantially as shown and described.

Broadly defined, the present invention according to another aspect includes a cable pathway divider for installation on a cable runway. The cable pathway divider includes a pair of post halves and a ring-shaped locking member. Each post half includes a base portion and an extension portion, and the base portions of the post halves are arrangeable at opposite sides of a cross member of a cable runway. The post halves are securable to one another from opposite sides of the cross member, via clamping arrangement of the ring-shaped locking member relative to the post halves, such that the extension portions extend into a space above the cable runway to divide the cable runway into at least two cable paths.

In features of this aspect, the post halves may be interlocking post halves; the post halves may be identical to one another; the extension portion of each post half may have a generally tapered shape such that the extension portion is wider at a proximal end than at a distal end; and/or each post half may include one or more alignment tabs to facilitate alignment when the post halves are coupled together during installation.

In another feature of this aspect, each post half may include a prong and a socket disposed at opposite sides of a center line. In another feature of this aspect, when the post halves are coupled together during installation, the prong of each post half may be received within the socket of the other post half.

In another feature of this aspect, the base portion of each post half may include a receiving channel. In another feature of this aspect, when the post halves are coupled together during installation, the receiving channels of the base portions of each post half may cooperate to receive the cross member of the cable runway.

In another feature of this aspect, each post half may include a slot at a distal end of the extension portion and a hinge member having a tab, each of the slot and the hinge member being disposed at opposite sides of a center line. In another feature of this aspect, when the post halves are coupled during installation, the tab of each post half may be received within the slot of the other post half, thereby defining a hinge mechanism.

In another feature of this aspect, the ring-shaped locking member may include tapered grip sections, arranged at opposite exterior-facing sides thereof, to facilitate arrangement of the ring-shaped locking member relative to the post halves.

In another feature of this aspect, at least one post half may include a retaining boss to retain the ring-shaped locking member in a locked state relative to the pair of post halves. In another feature of this aspect, the ring-shaped locking member may include at least one recess to accommodate the retaining boss.

In another feature of this aspect, the pair of post halves and the ring-shaped locking member may be made from a plastic material.

In another feature of this aspect, the cross member may be a UL crossbar. In another feature of this aspect, the cross member may be a universal crossbar. In another feature of this aspect, the cross member may be an extruded aluminum crossbar.

Broadly defined, the present invention according to another aspect includes a multi-path cable runway. The multi-path cable runway includes a pair of spaced-apart parallel rails and at least one cross member interconnected between the pair of spaced-apart parallel rails. The pair of spaced-apart parallel rails and the at least one cross member, together, define a cable runway. The multi-path cable runway further includes at least one cable pathway divider installed on the at least one cross member. The at least one cable pathway divider includes a pair of post halves, each having a base portion and an extension portion, and further includes a ring-shaped locking member that secures the pair of post halves together via clamping arrangement. With the at least one cable divider installed on the at least one cross member, the base portions of the post halves are arranged at opposite sides of the at least one cross member and the extension portions of the post halves extend into a space above the cable runway to divide the cable runway into at least two cable paths.

In features of this aspect, the post halves of the at least one cable pathway divider may be interlocking post halves; the post halves of the at least one cable pathway divider may be identical to one another; the extension portion of each post half of the at least one cable pathway divider may have a generally tapered shape such that the extension portion is wider at a proximal end than at a distal end; and/or each post half of the at least one cable pathway divider may include one or more alignment tabs to facilitate alignment of the post halves relative to one another.

In another feature of this aspect, each post half of the at least one cable pathway divider may include a prong and a socket disposed at opposite sides of a center line. In another feature of this aspect, with the at least one cable divider installed on the at least one cross member, the prong of each post half may be received within the socket of the other post half.

In another feature of this aspect, the base portion of each post half of the at least one cable pathway divider may include a receiving channel. In another feature of this aspect, with the at least one cable divider installed on the at least one cross member, the receiving channels may receive the at least one cross member of the cable runway.

In another feature of this aspect, each post half of the at least one cable pathway divider may include a slot at a distal end of the extension portion and a hinge member having a tab, each of the slot and the hinge member being disposed at opposite sides of a center line. In another feature of this aspect, with the at least one cable divider installed on the at least one cross member, the tab of each post half may be received within the slot of the other post half.

In another feature of this aspect, the ring-shaped locking member of the at least one cable pathway divider may include tapered grip sections, arranged at opposite exterior-facing sides thereof, to facilitate arrangement of the ring-shaped locking member relative to the post halves.

In another feature of this aspect, at least one post half of the at least one cable pathway divider may include a retaining boss for retaining the ring-shaped locking member in a locked state relative to the pair of post halves. In another feature of this aspect, the ring-shaped locking member of the at least one cable pathway divider may include at least one recess to accommodate the retaining boss.

In another feature of this aspect, the pair of post halves and the ring-shaped locking member of the at least one cable pathway divider may be made from a plastic material.

In another feature of this aspect, the at least one cross member may be a UL crossbar. In another feature of this aspect, the at least one cross member may be a universal crossbar. In another feature of this aspect, the at least one cross member may be an extruded aluminum crossbar.

Broadly defined, the present invention according to another aspect includes a method of installing a cable pathway divider on a cable runway. The method includes: providing a cable pathway divider having a pair of post halves, each post half including a base portion and an extension portion; arranging the pair of post halves to face one another from opposite sides of a cross member of the cable runway such that the cross member is disposed between the base portions and the extension portions extend into a space above the cable runway; positioning a ring-shaped locking member relative to the pair of post halves such that distal ends of the extension portions extend through the ring-shaped locking member; and maneuvering the ring-shaped locking member along the pair of post halves, from the distal ends toward the base portions, to clamp the pair of post halves together.

In features of this aspect, the method may further include aligning the pair of post halves with one another via alignment tabs disposed on each post half; and/or the method may further include inserting a prong of each post half into a socket of the other post half, wherein, for each post half, the prong and the socket are disposed at opposite sides of a center line.

In another feature of this aspect, the method may further include engaging a hinge member of each post half into a slot at the distal end of the extension portion of the other post half, thereby forming a hinge mechanism, wherein, for each post half, the hinge member and the slot are disposed at opposite sides of a center line. In another feature of this aspect, the method may further include rotating the pair of post halves toward one another about the hinge mechanism.

In another feature of this aspect, the method may further include securing the pair of post halves together, via the ring-shaped locking member, by engaging a retaining boss of at least one of the pair of post halves with at least one recess of the locking member.

In other features of this aspect, the post halves may be interlocking post halves; and/or the post halves may be identical to one another.

In another feature of this aspect, the cross member may be a UL crossbar. In another feature of this aspect, the cross member may be a universal crossbar. In another feature of this aspect, the cross member may be an extruded aluminum crossbar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
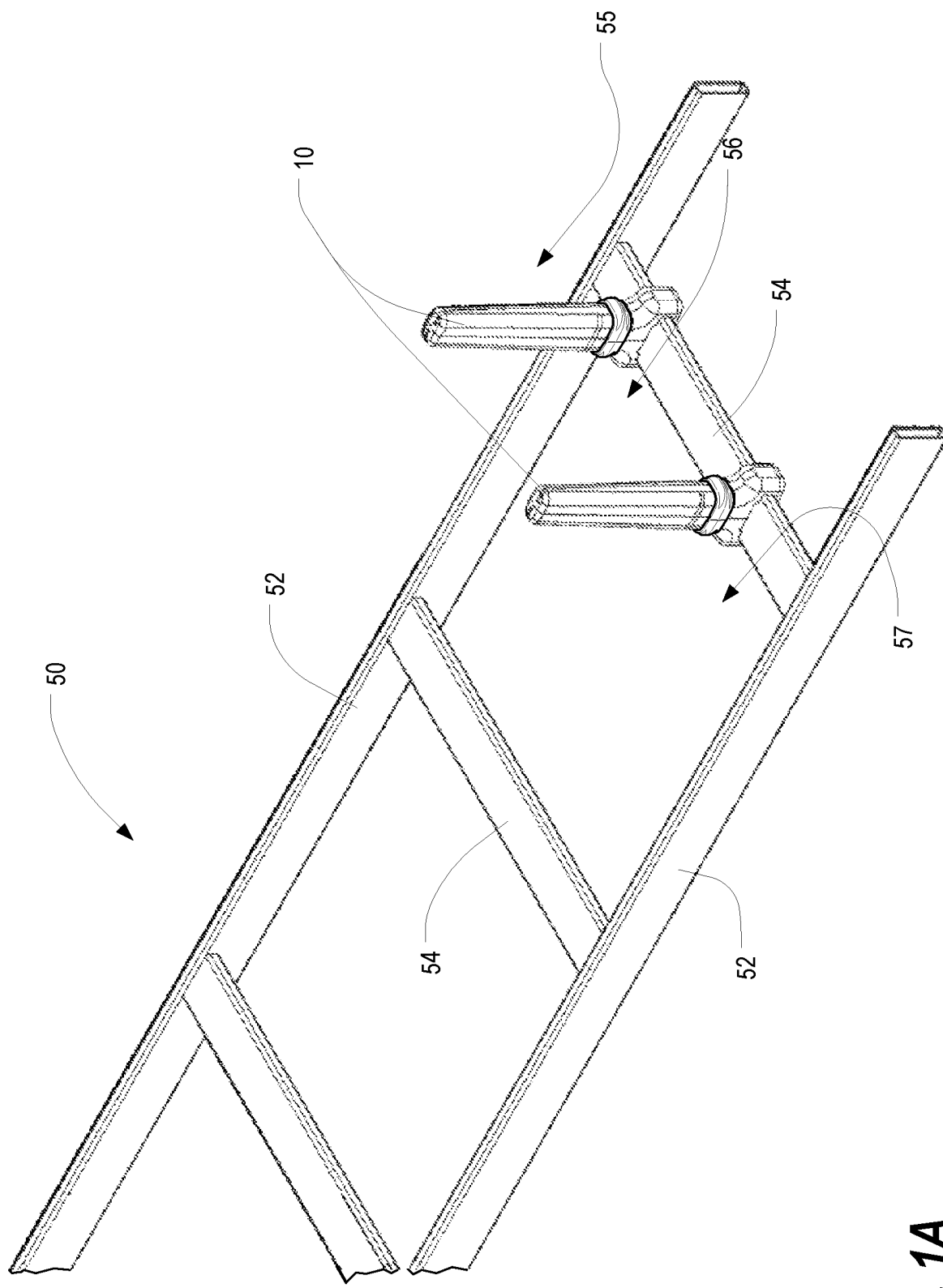
FIG. 1A is an isometric view of a pair of cable pathway dividers in accordance with one or more preferred embodiments of the present invention, shown installed on a cable runway.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1A is an isometric view of a pair of cable pathway dividers 10 in accordance with one or more preferred embodiments of the present invention, shown installed on a cable runway 50. As shown in FIG. 1A, the cable runway 50 is generally produced from a pair of spaced-apart parallel rails 52 and a plurality of transverse cross members 54 that interconnect the rails 52 at various intervals. Although not required, it is contemplated that the transverse cross members 54 are located at generally evenly-spaced intervals. The two cable pathway dividers 10 are installed on one of the transverse cross members 54, but it will be appreciated that cable pathway dividers 10 may be installed on as many different transverse cross members 54 as desired, and that more than or less than two cable pathway dividers 10 may be installed on a particular transverse cross member 54. Each cable pathway divider 10 extends upwardly from the transverse cross member 54 into the space immediately above the cable runway 50.

Figure 1B:
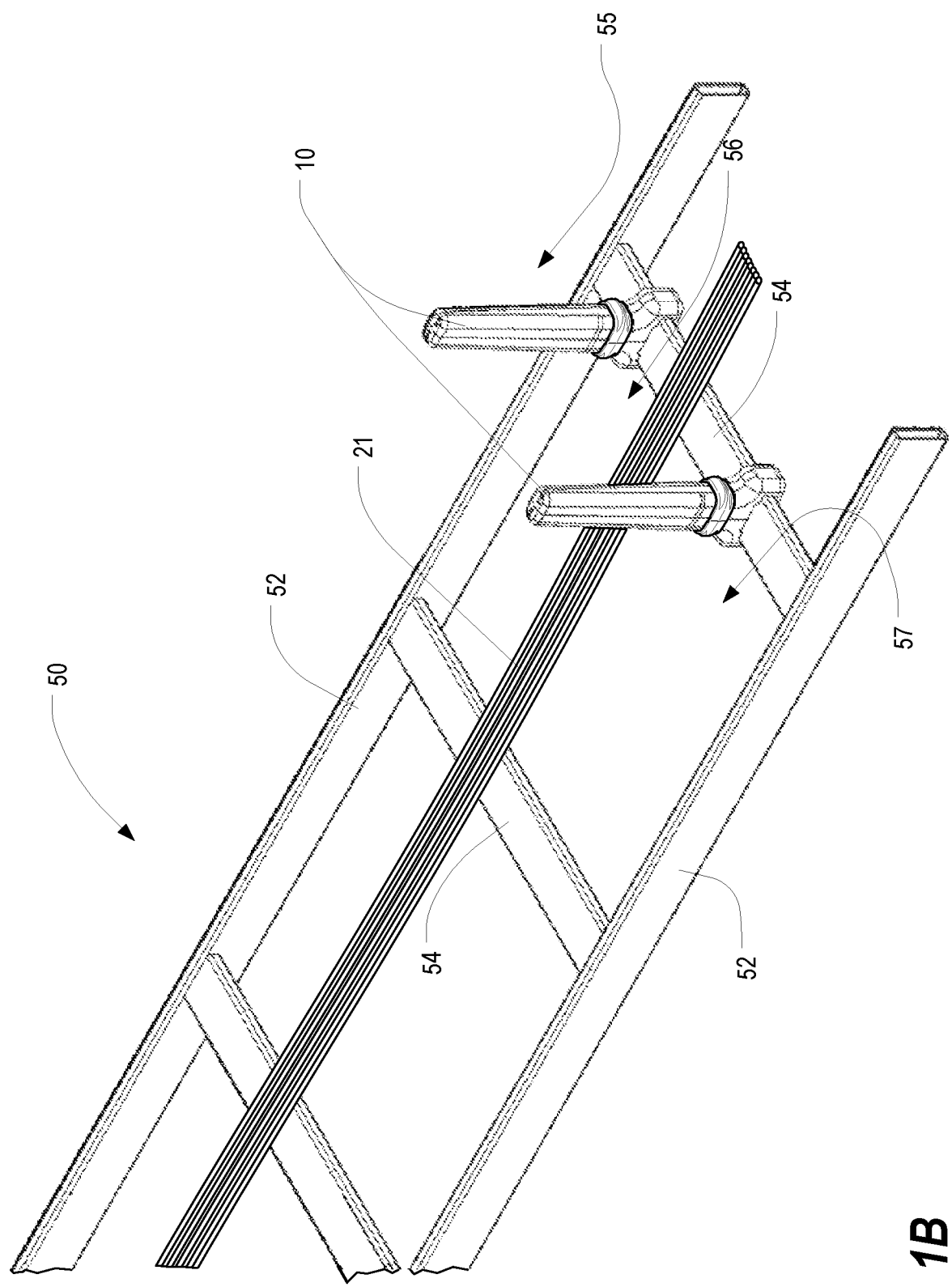
FIG. 1B is an isometric view of the arrangement of FIG. 1A, shown with a cable bundle installed between the pair of cable pathway dividers in accordance with one or more preferred embodiments of the present invention.

Either alone or in combination with other such dividers installed on other transverse cross members 54, the cable pathway dividers 10 define separate cable pathways on the cable runway 50. In particular, it is contemplated that the two dividers 10 installed on the cable runway of FIG. 1A define up to three distinct cable pathways (i.e., a first cable pathway 55 to the right of a first of the two dividers 10, a second cable pathway 56 between the two dividers 10, and a third cable pathway 57 to the left of the second of the two dividers). Although only two dividers 10 are shown installed in FIG. 1A, it is contemplated that more or less dividers 10 can be installed on a single transverse cross member 54 in order to define the desired quantity of separate cable pathways. Once established by cable pathway dividers 10, each cable pathway 55,56,57 may accommodate one or more cables, including cable bundles, therein. In this regard, FIG. 1B is an isometric view of the arrangement of FIG. 1A, shown with a cable bundle 21 installed between the pair of cable pathway dividers 10 in accordance with one or more preferred embodiments of the present invention. In particular, the cable bundle 21 is installed in the second cable pathway 56 defined by the two cable pathway dividers 10.

Figure 2:
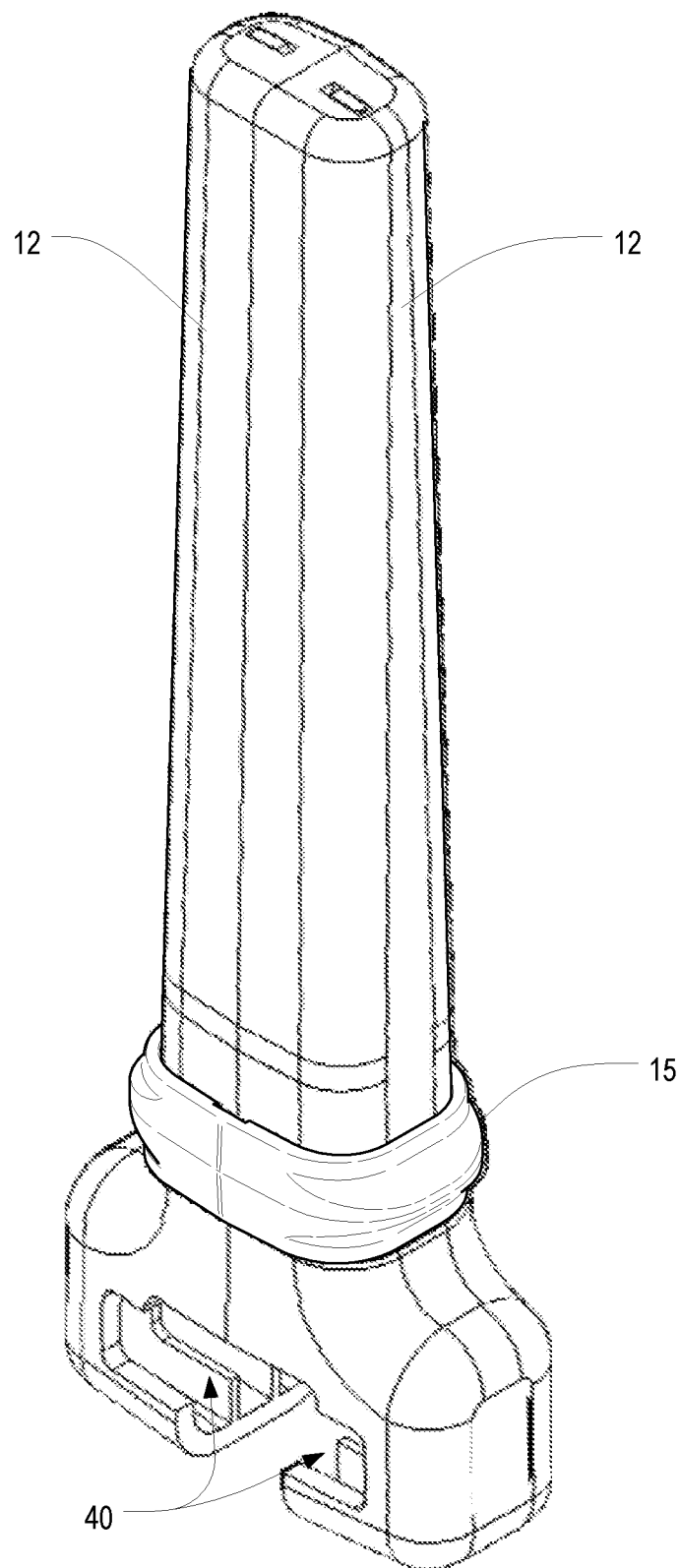
FIG. 2 is an isometric view of one of the cable pathway dividers of FIG. 1A.
Figure 3:
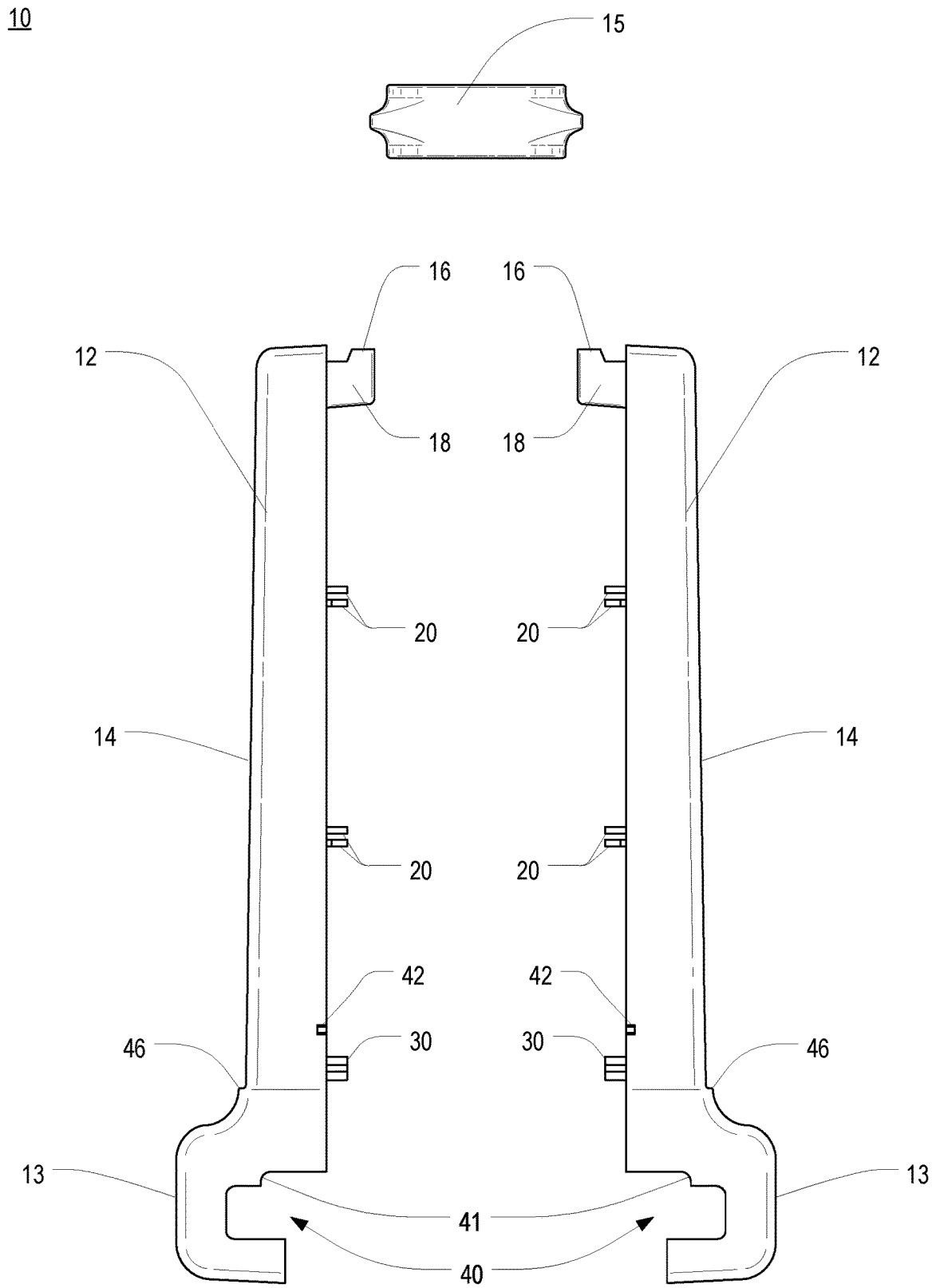
FIG. 3 is an exploded top view of the cable pathway divider of FIG. 2.

FIG. 2 is an isometric view of one of the cable pathway dividers 10 of FIG. 1A, and FIG. 3 is an exploded top view of the cable pathway divider 10 of FIG. 2. As shown in FIGS. 2 and 3, each cable pathway divider 10 includes a pair of post halves 12 and a separate locking ring 15. The post halves 12 are attachable to one another in a non-permanent manner around a transverse cross member 54 (which is accommodated within the channels 40 defined by the two post halves 12). In a contemplated embodiment, the post halves 12 are identical to one another, at least for the sake of convenience, but it will be appreciated that non-identical post "halves" may be substituted. When the two post halves 12 are coupled or otherwise mated with one another, the locking ring 15 may be slid over the coupled post halves 12 in order to lock the post halves 12 together. As further described hereinbelow, when the post halves 12 are installed on a transverse cross member 54 as shown in FIG. 1A, the locking ring 15 locks the cable pathway divider 10 into position on the transverse cross member 54.

Figure 4A:
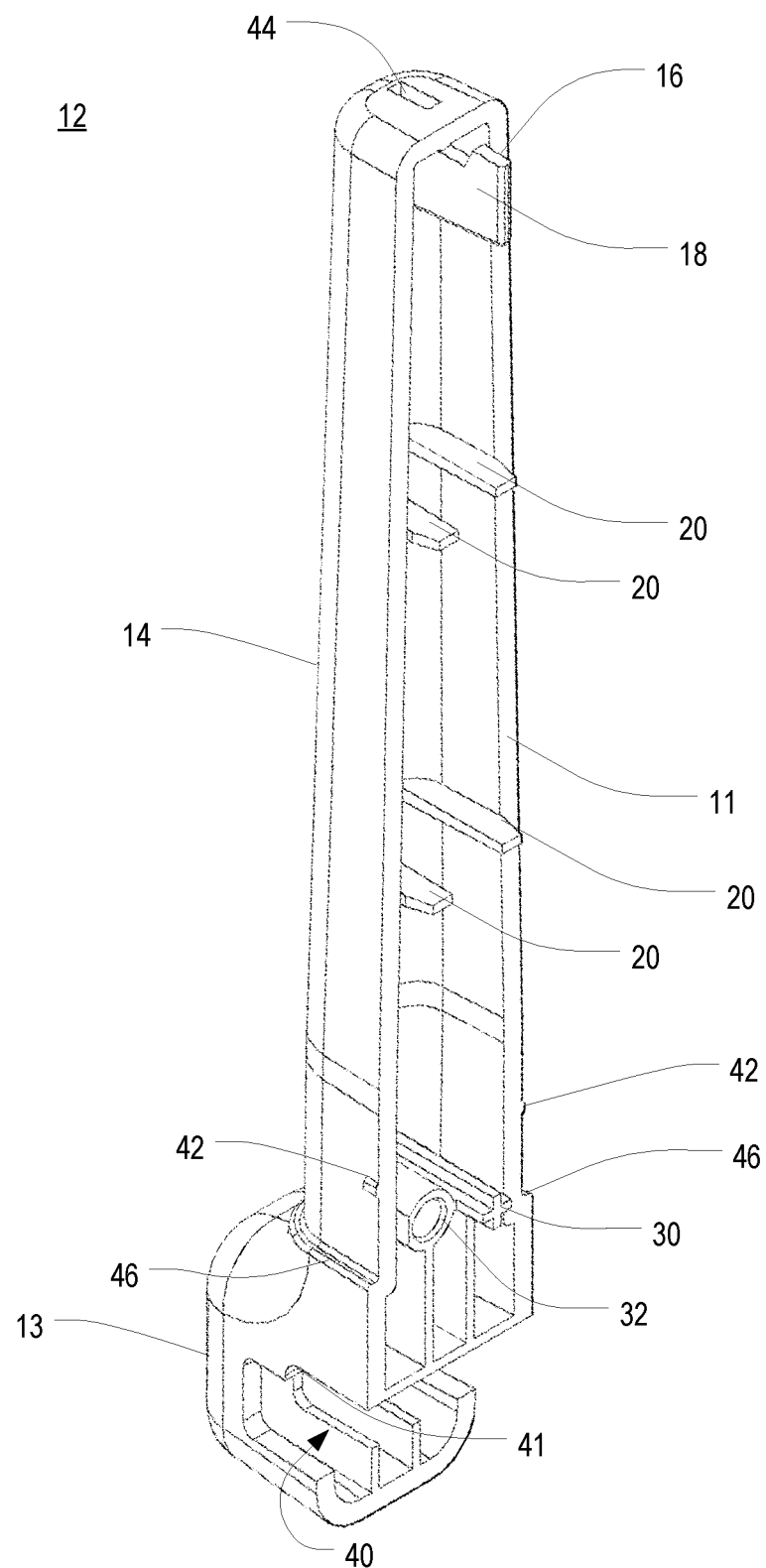
FIGS. 4A and 4B are an isometric view and a front view, respectively, of one post half of the cable pathway divider of FIG. 2.
Figure 4B:
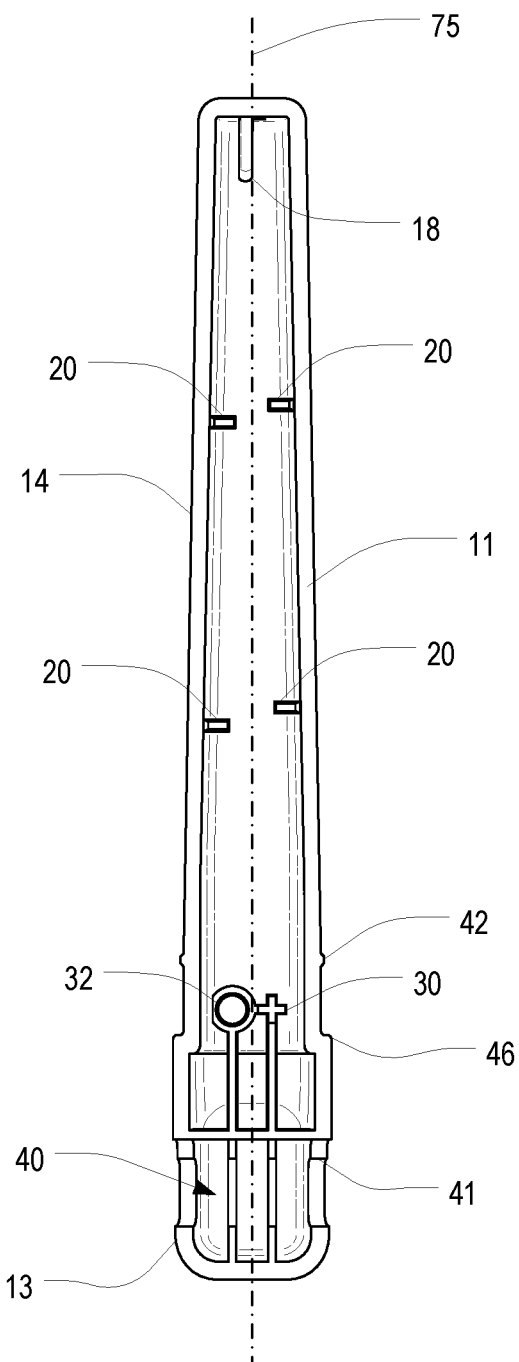

FIGS. 4A and 4B are an isometric view and a front view, respectively, of one post half 12 of the cable pathway divider 10 of FIG. 2. The post half 12 includes a base portion 13 and an extension portion 14 that extends upward from the base portion 13. In at least some embodiments, each post extension portion 14 is tapered slightly such that the extension portion 14 is wider adjacent the base portion 13 and narrower toward its distal end. A ledge 46 is established at the juncture between the extension portion 14 and the base portion 13. In a contemplated embodiment, the base portion 13 and the extension portion 14 are each part of a unitary structure. It is further contemplated that the post halves 12 can be made from a wide variety of different materials. In various contemplated embodiments, the post halves 12 are made from a plastic material. In some such embodiments, the post halves 12 are made using an injection molding process.

As further shown in FIGS. 4A and 4B (and with additional reference to FIG. 3), each post half 12 may be hollow (so as to save on raw material) but includes a peripheral edge surface 11 that is arranged to abut the edge surface 11 of the other post half 12. Alternatively, the post halves 12 may be solid or partially solid. Each post half 12 preferably includes a plurality of alignment tabs 20 that extend beyond the peripheral edge surface 11 of the post half 12 and that help to facilitate alignment of the post halves 12 during the process of installing the divider 10 on a transverse cross member 54. The tabs 20 may be arranged in pairs on the interior of the post half 12, with tabs 20 of each pair arranged along opposite sides of the post half (with one tab 20 of each pair disposed to one side of a center line 75 and the other tab 20 of each pair disposed to the other side of the center line 75). Furthermore, within each pair, the tabs 20 may be slightly offset from one another in the longitudinal direction (i.e., in the direction from the proximal end toward the distal end of the post halves 12). When the post halves 12 are coupled together, as described in greater detail below, each alignment tab 20 from one post half 12 is paired against, and can at least slightly overlap with, a corresponding alignment tab 20 from the other post half 12. Alignment tabs 20 from each post half 12 abut against one another as the post halves 12 are brought together, thereby helping to facilitate alignment during the installation process. However, it will be appreciated that other alignment structures may be utilized, or in some cases may be omitted (at the potential cost of convenience and/or ease of use).

Each post half 12 also preferably includes a prong 30 and a corresponding socket 32. The prong 30 extends from the interior of the post half 12 and beyond the peripheral edge surface 11 thereof. The socket 32 is disposed adjacent to the prong 30 and is sized to receive the prong 30 of the other post half 12. In order to align the respective prongs 30 and sockets 32, the prong 30 and the socket 32 are also arranged generally at either side of the center line 75 of the post half 12 (with the prong 30 disposed to one side of the center line 75 and at least a majority of the socket 32 disposed to the other side of the center line 75). In this regard, when the post halves 12 are coupled together, the prong 30 of each post half 12 is received within the socket 32 of the other post half 12. Again, in various alternative embodiments, other alignment structures may be alternatively or additionally utilized.

Figure 5:
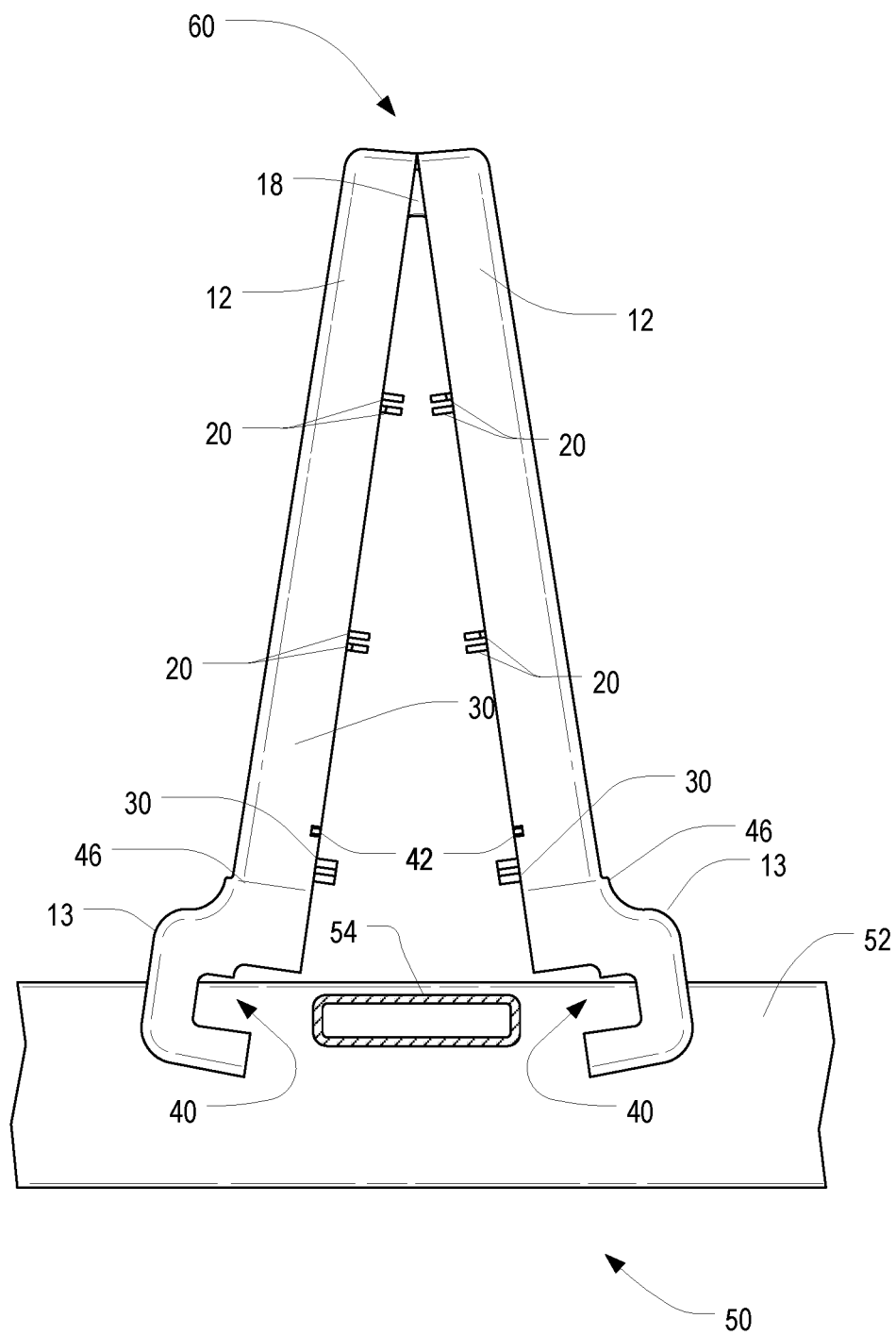
FIG. 5 is a fragmentary top view of portions of the cable runway and a cable pathway divider of FIG. 1A, shown with the post halves of one of the cable pathway dividers in a partially separated state.

FIG. 5 is a fragmentary top view of portions of the cable runway 50 and a cable pathway divider 10 of FIG. 1A, shown with the post halves 12 of one of the cable pathway dividers 10 in a partially separated state. As shown in FIGS. 2-5, the base portion 13 of each post half 12 includes an open-sided channel 40 extending all the way therethrough. When the post halves 12 are coupled together during the installation process, the base portions 13 of each post half 12 are brought together around the transverse cross member 54, which is received within the combined channels 40. When the post halves 12 are arranged adjacent to one another with the respective channels 40 facing each other, the combined channels 40 are sized and shaped to accommodate one or more different transverse cross members 54. In particular, the combined channels 40 of the post halves 12 are well-suited to accommodate transverse cross members 54 of varying sizes and cross-sectional shapes, as will be explained in further detail below.

Figure 6:
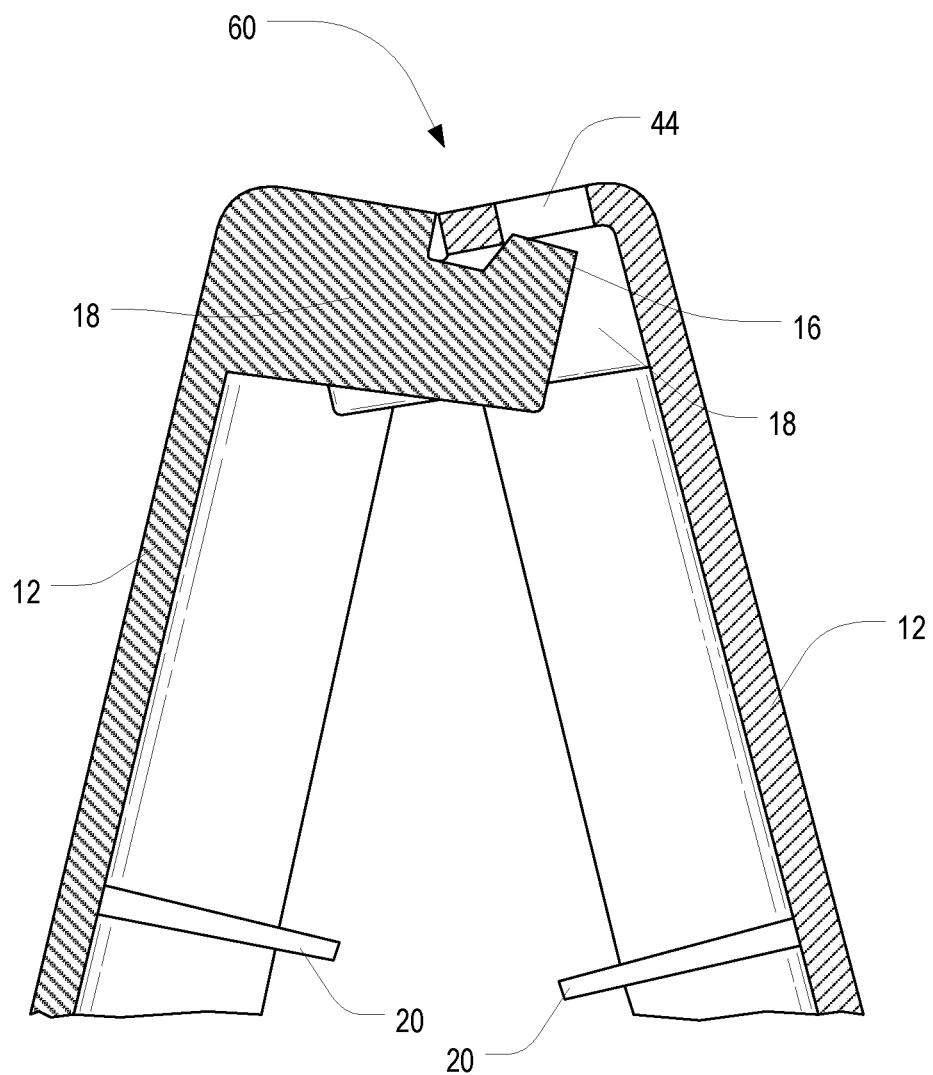
FIG. 6 is an enlarged fragmentary cross-sectional view of portions of the two post halves of the cable pathway divider of FIG. 5, illustrating a hinge mechanism established therebetween.

FIG. 6 is an enlarged fragmentary cross-sectional view of portions of the two post halves 12 of the cable pathway divider 10 of FIG. 5, illustrating a hinge mechanism 60 established therebetween. With reference to FIGS. 3-6, the pair of post halves 12 can be hinged to one another at their distal ends and then brought together around a transverse cross member 54 of the cable runway 50. As perhaps best seen in FIGS. 3 and 4A, each post half 12 includes a hinge member 18 with a tab 16 extending upwardly away therefrom. Additionally, as perhaps best seen in FIGS. 4A and 4B, each post half 12 includes a slot 44 disposed in the distal (i.e., top) end of the extension portion 14. As with the prong 30 and the socket 32 discussed previously, the hinge member tab 16 and the slot 44 are each slightly off from the center line 75 of the post half 12 (with the hinge member 18 and tab 16 disposed to one side of the center line 75 and the slot 44 disposed to the other side of the center line 75).

During installation of the cable pathway divider 10, the extension portions 14 of the two post halves 12 are brought together and engaged so that the tab 16 of each post half 12 is positioned within the slot 44 of the other post half 12 in an interlocking manner (as perhaps best seen in FIG. 6). Once the post halves 12 are engaged in this manner, the hinge members 18 effectively define a hinge mechanism 60, and the base portions 13 of the two post halves 12 can be brought together around a transverse cross member 54 of the cable runway 50 (as perhaps best seen in FIG. 5). As the base portions 13 are brought together, the alignment tabs 20 of the post halves 12 abut one another in order to help align the post halves 12 in an appropriate installation position. Additionally, the prong 30 of each post half 12 is received within the socket 32 of the other post half 12.

It will be appreciated that in embodiments in which the post halves are not identical to each other, a slot 44 may be provided in only one such post half and a hinge member tab 16 may be provided in only the other such post half. Furthermore, it will be appreciated that other hinge mechanisms, such as barrel hinges, pivot hinges, gate hinges, and the like, may be alternatively or additionally utilized.

As noted previously, the channels 40 of the base portions 13 are sized to correspond with and receive, when arranged adjacent to and facing each other, the cross sectional shape of the transverse cross member 54. Once the post halves 12 are coupled to one another (with the transverse cross member 54 received in the channels 40 between the respective base portions 13), the locking ring 15 can be installed to clamp the post halves 12 together. In this regard, FIG. 7 is an isometric view of the locking ring 15 of the cable pathway divider 10 of FIG. 2, and FIG. 8 is an isometric view of the cable pathway dividers 10 and cable runway 50 of FIG. 1A, shown with the locking ring 15 of one of the dividers 10 being installed and/or removed from the post halves 12.

Figure 7:
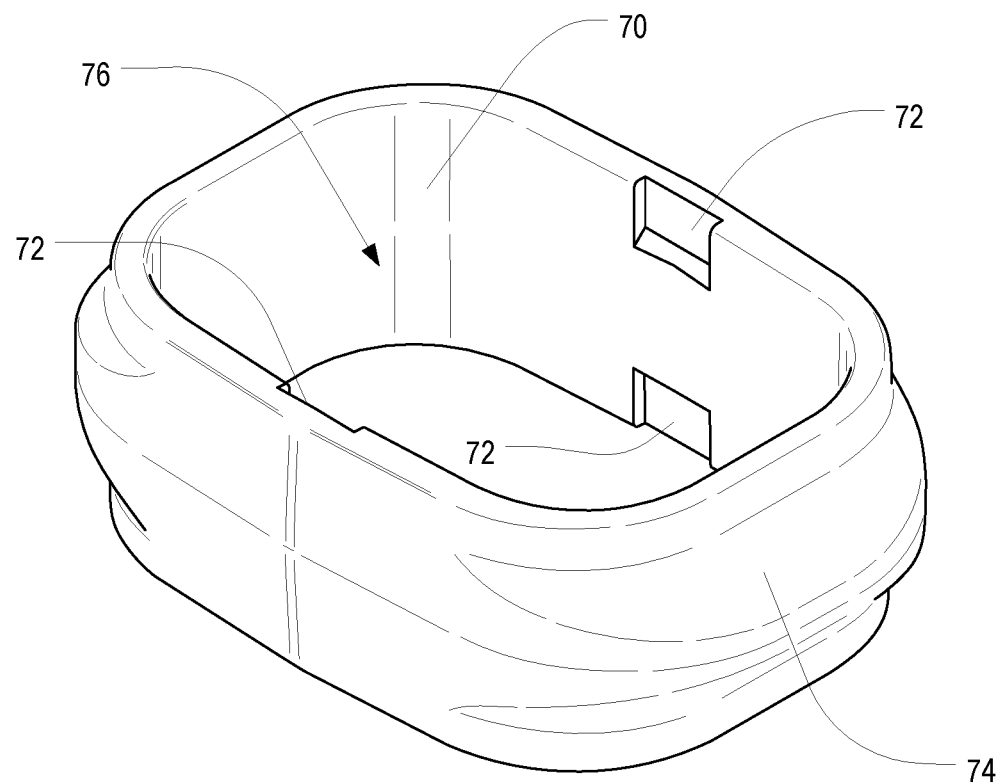
FIG. 7 is an isometric view of the locking ring of the cable pathway divider of FIG. 2.

As shown in FIG. 7, the locking ring 15 includes a sidewall 70 that defines an opening 76 for receiving the post halves 12 of the cable pathway divider 10. In a contemplated embodiment, the locking ring 15 is made from a plastic material. The inner surfaces of the sidewall 70 include a plurality of recesses 72 to facilitate locking engagement with the post halves 12. In at least some embodiments, recesses 72 are located at opposite sides of the sidewall 70 at both upper and lower edges thereof. With recesses 72 being located at both upper and lower edges of the sidewall 70, it is contemplated that the locking ring 15 does not necessarily have a pre-established upward/downward orientation for installation on the post halves 12 (i.e., the locking ring 15 can be installed on the post halves 12 in the orientation shown in FIG. 7 or alternatively can be installed in an inverted orientation).

As further shown in FIG. 7, the sidewall 70 preferably includes grips 74 disposed at opposite exterior-facing sides thereof. The grips 74 are shown as tapered sections of the sidewall 70 (that taper outwardly from upper and lower edges of the sidewall 70). In this regard, the grips 74 define an area against which a user can position his or her fingers (at either or both sides of the locking ring 15) in order to push the locking ring 15 downward onto the post halves 12.

Figure 8:
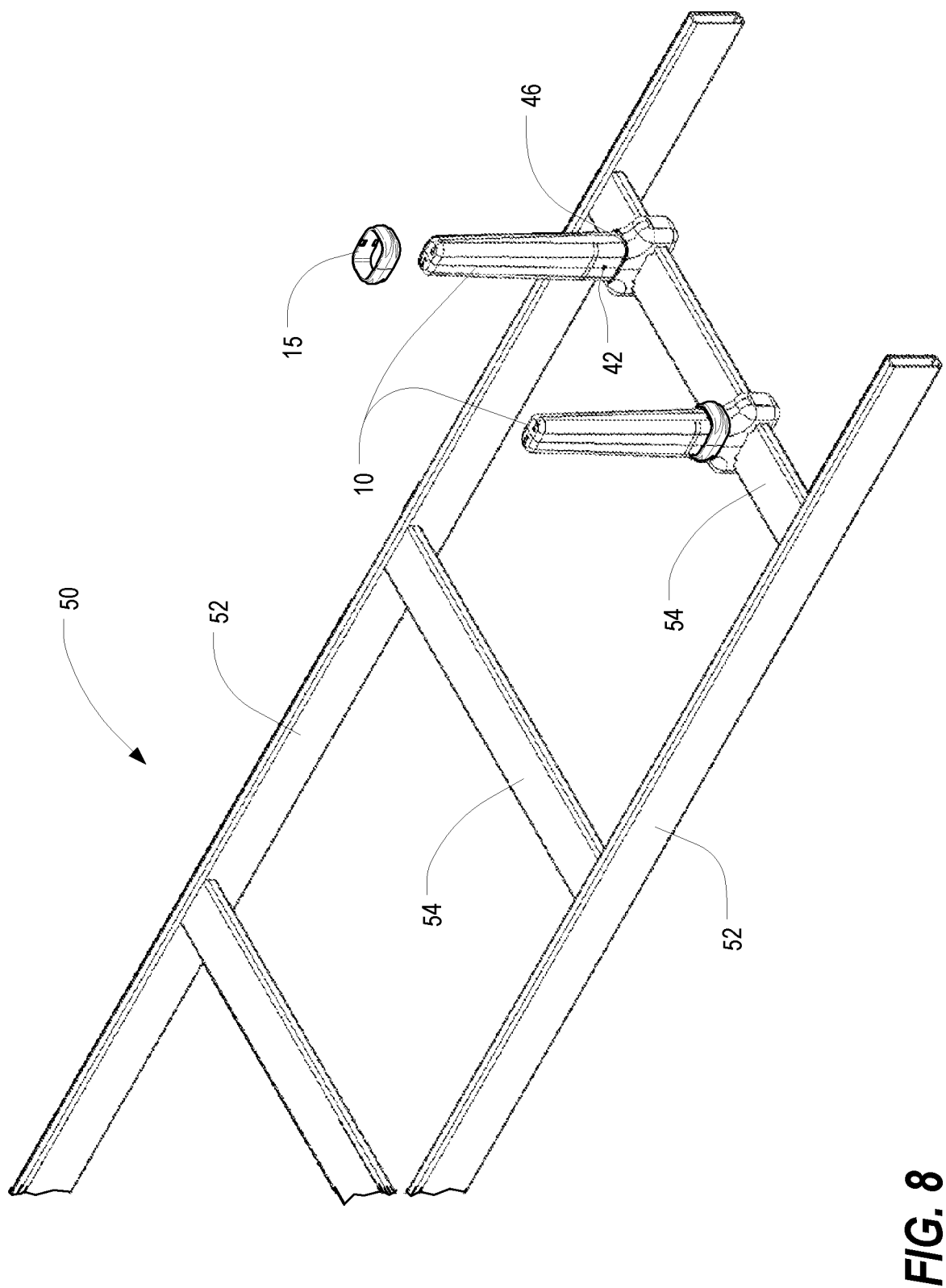
FIG. 8 is an isometric view of the cable pathway dividers and cable runway of FIG. 1A, shown with the locking ring of one of the dividers being installed and/or removed from the post halves.

As perhaps best illustrated in FIGS. 3, 4A and 8, each post half 12 includes one or more retaining bosses 42 along the side thereof and near the proximal end of the extension portion 14. Once the post halves 12 are coupled to one another, as discussed above, the locking ring 15 can be fit over the distal ends of the post halves 12 and pushed downward toward the ledges 46 of the post halves. Because the post halves 12 are slightly tapered toward the distal ends thereof, it is contemplated that the locking ring 15 can be fit over the distal ends of the post halves 12 with relative ease. Then, as the post halves 12 become wider toward the proximal ends thereof, a greater pushing force may be required. In this regard, the grips 74 of the locking ring 15 provide a surface and/or structure upon which a downward pushing force can be applied, particularly as the extension portions 14 becomes wider at the proximal end thereof and as the bottom of the locking ring 15 encounters the retaining bosses 42 and must be pushed past them.

Once the bottom of the locking ring 15 has been pushed past the retaining bosses 42 and into abutment with the ledges 46 of the post halves 12, the retaining bosses 42 of the post halves 12 engage with the corresponding recesses 72 along the upper edge of the locking ring 15. (As noted previously, the recesses 72 along the bottom edge of the ring are provided so that the ring 15 may function in an inverted orientation.) When the retaining bosses 42 are engaged with the recesses 72, the locking ring 15 is retained in place (i.e., locked) at the proximal end of the extension portions 14 between the ledges 46 and the retaining bosses 42. In this regard, the locking ring 15 clamps the post halves 12 to the transverse cross member 54 and effectively locks the cable pathway divider 10 tightly into position on the cable runway 50. It is contemplated that the opening 76 in the locking ring 15 can be sized, relative to the cross-sectional shape of the post halves 12 at the proximal end of the extension portions 14, in order to provide a tight fit and thereby ensure that the locking ring 15 clamps the post halves 12 tightly onto the transverse cross member 54. In the locked state, the extension portions 14 of the post halves 12 extend upwardly into the space above the cable runway 50 in order to help define two or more separate cable pathways.

Figure 9:
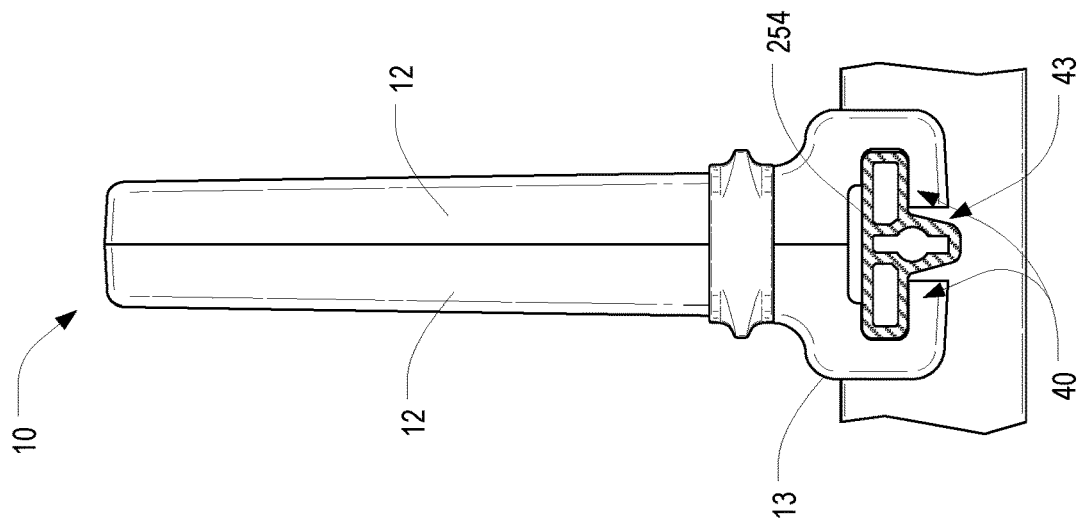
FIG. 9 is a fragmentary front view of the cable pathway divider of FIG. 2 shown installed on a transverse cross member of a first cross-sectional geometry.
Figure 10:
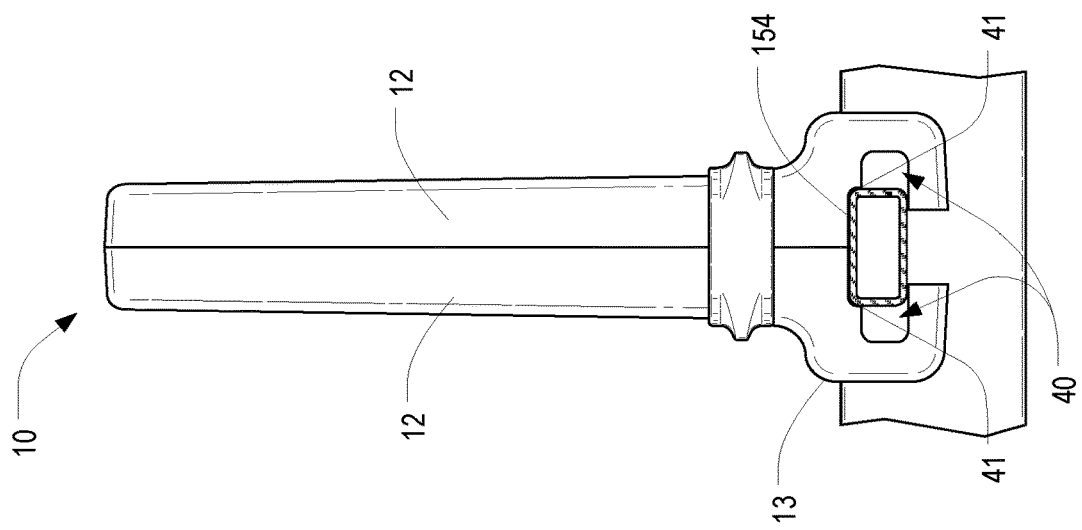
FIG. 10 is a fragmentary front view of the cable pathway divider of FIG. 2 shown installed on a transverse cross member of a second cross-sectional geometry.
Figure 11:
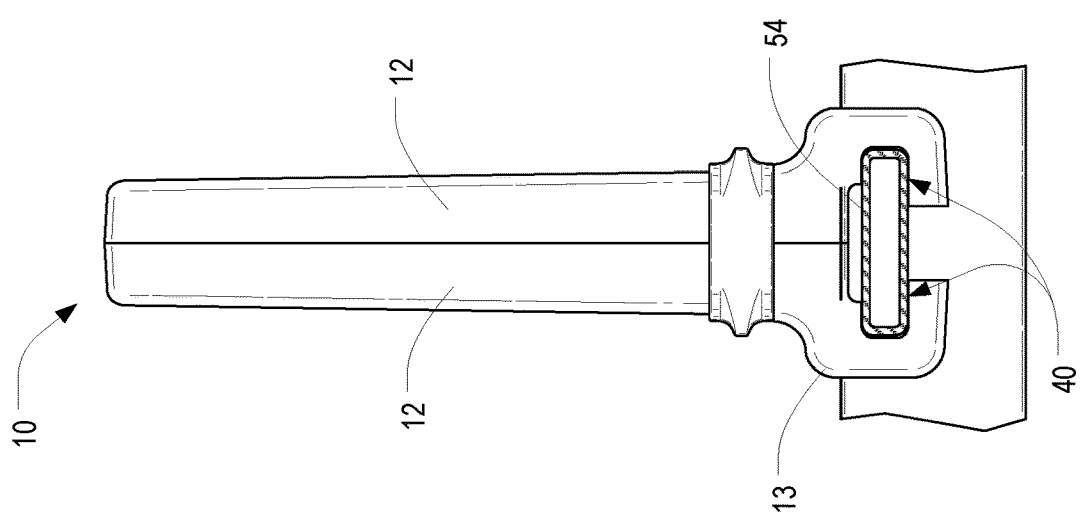
FIG. 11 is a fragmentary front view of the cable pathway divider of FIG. 2 shown installed on a transverse cross member of a third cross-sectional geometry.

In at least some embodiments, the channels 40 of the post halves 12 (and, thus, of the base portion 13 of each cable pathway divider 10 as a whole) are sized and shaped to fit around transverse cross members 54 of different cross-sectional shapes or geometries. In this regard, FIG. 9 is a fragmentary front view of the cable pathway divider 10 of FIG. 2 shown installed on a transverse cross member 54 of a first cross-sectional geometry, FIG. 10 is a fragmentary front view of the cable pathway divider 10 of FIG. 2 shown installed on a transverse cross member 154 of a second cross-sectional geometry, and FIG. 11 is a fragmentary front view of the cable pathway divider 10 of FIG. 2 shown installed on a transverse cross member 254 of a third cross-sectional geometry. In particular, the transverse cross member of FIG. 9 is an industry-standard crossbar sometimes referred to as a "universal crossbar," the transverse cross member in FIG. 10 is an industry-standard crossbar sometimes referred to as a "UL crossbar," and the transverse cross member in FIG. 11 is an extruded aluminum crossbar offered by Chatsworth Products, Inc. of Westlake Village, Calif.

As generally shown in FIGS. 9-11, it is contemplated that a cable pathway divider 10 in accordance with one or more preferred embodiments of the present invention can be installed on a wide variety of different transverse cross members 54,154,254 of a cable runway 50. In each case, the channels 40 within the base portions 13 of the respective post halves 12 include features that faciliate accommodation of different types of accepted cross members commonly used with cable runways. In particular, it is contemplated that a single pair of identical post halves 12 can include channels 40 capable of accommodating cross members 54,154,254 of varying cross-sectional shapes or geometries. As shown in FIG. 9, the universal crossbar 54 includes an elongated generally rectangular cross-sectional shape. As shown in FIG. 10, the UL crossbar 154 includes a generally rectangular cross-sectional shape that is not as elongated as that of the universal crossbar of FIG. 9. In this regard, the channels 40, include notches 41 to accommodate the shorter rectantuglar shape of the UL crossbar 154. A better view of the notches 41 of the channels can be seen in FIGS. 3 and 4A. As shown in FIG. 11, the extruded aluminum cross bar 254 includes an elongated generally rectangular shape similar to the universal crossbar 54 of FIG. 9, but with an additional extruded portion that extends through a gap 43 defined between the base portions 13 of the post halves 12.

As discussed herein, a cable pathway divider 10 in accordance with one or more preferred embodiments of the present invention is capable of quick and easy installation on a transverse cross member 54,154,254 of a cable runway without the aid of tools. It is further contemplated, that such a cable pathway divider 10 is capable of removal and re-installation in a different location with relative ease, thereby helping to facilitate easy customization of a cable runway 50 to suit a particular set of cabling requirements.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method of securing a cable pathway divider to a cable runway, the method comprising:
    providing a cable runway including a pair of parallel rails and a plurality of transverse cross members, each transverse cross member extending between the pair of parallel rails;
    providing a cable pathway divider having a pair of post halves, each including a base portion and an extension portion that extends away from the base portion, wherein each extension portion includes a slot at a distal end thereof and a hinge member having a tab that extends at an angle away from the hinge member, each of the slot and the hinge member being disposed at opposite sides of a center line;
    arranging the post halves at opposite sides of a selected cross member of the cable runway;
    positioning the tab of each post half within the slot of the other post half, thereby defining a hinge mechanism that facilitates rotational movement of each post half relative to the other; and
    rotating the post halves toward one another such that the post halves are arranged in a side-by-side relationship with the selected cross member received within a combined channel defined by the base portions and the extension portions extending into a space above the cable runway, thereby dividing the space above the cable runway into separate cable pathways.

2. The method of claim 1, wherein the cable pathway divider includes an annular locking member.

3. The method of claim 2, further comprising:
    positioning the annular locking member relative to the post halves such that distal ends of the extension portions are jointly received through an opening; and
    sliding the annular locking member toward proximal ends of the extension portions, thereby facilitating clamping arrangement of the annular locking member relative to the post halves.

4. The method of claim 3, wherein each extension portion is wider at a proximal end than at a distal end.

5. The method of claim 3, wherein each extension portion is gradually tapered along its length.

6. The method of claim 1, wherein the post halves are identical to one another.

7. The method of claim 1, wherein each post half includes an alignment tab that extends beyond an interior-facing surface thereof.

8. The method of claim 7, further comprising positioning the alignment tab of one of the post halves against the alignment tab of the other of the post halves when the post halves are rotated toward one another for arrangement in the side-by-side relationship.

9. The method of claim 1, wherein each post half includes a prong and a socket disposed at opposite sides of a center line.

10. The method of claim 9, further comprising fitting the prong of each post half within the socket of the other post half when the post halves are rotated toward one another for arrangement in the side-by-side relationship.

\* \* \* \* \*